(12) United States Patent
Cranney, III

(10) Patent No.: US 10,899,586 B2
(45) Date of Patent: Jan. 26, 2021

(54) CRANE POSITION INDICATOR

(71) Applicant: Richard A. Cranney, III, Cleveland, TX (US)

(72) Inventor: Richard A. Cranney, III, Cleveland, TX (US)

(*) Notice: Subject to any disclaimer, the term of this patent is extended or adjusted under 35 U.S.C. 154(b) by 142 days.

(21) Appl. No.: 15/973,256

(22) Filed: May 7, 2018

(65) Prior Publication Data
US 2019/0055111 A1 Feb. 21, 2019

Related U.S. Application Data

(60) Provisional application No. 62/547,008, filed on Aug. 17, 2017.

(51) Int. Cl.
| | | |
|---|---|---|
| *B66C 13/46* | (2006.01) | |
| *B66C 13/16* | (2006.01) | |
| *G02B 27/20* | (2006.01) | |
| *B66C 23/88* | (2006.01) | |
| *G01C 15/10* | (2006.01) | |

(52) U.S. Cl.
CPC ............. *B66C 13/16* (2013.01); *B66C 13/46* (2013.01); *B66C 23/88* (2013.01); *G01C 15/105* (2013.01); *G02B 27/20* (2013.01)

(58) Field of Classification Search
CPC .............................. B66C 13/46; G01C 15/105
USPC ......................................... 33/283, 286, 333
See application file for complete search history.

(56) References Cited

U.S. PATENT DOCUMENTS

| | | | | |
|---|---|---|---|---|
| 2,414,092 A * | 1/1947 | Charwinsky | ............... | B66C 1/40 33/397 |
| 3,117,480 A * | 1/1964 | Peddinghaus | .......... | B21D 28/04 83/520 |
| 4,177,964 A * | 12/1979 | Hujsak | ................... | B64G 1/646 114/250 |
| 4,273,243 A * | 6/1981 | Locher | .................... | B66C 13/08 212/273 |
| 5,481,809 A * | 1/1996 | Rooney | ................ | G01C 15/105 33/392 |
| 6,609,307 B1 * | 8/2003 | Haynes | ................ | A63D 15/005 33/227 |
| 6,648,156 B1 * | 11/2003 | Bryfors | ................... | B66C 13/46 212/270 |
| 8,220,169 B2 * | 7/2012 | Goddard | ............... | B66F 9/0755 33/264 |
| 2003/0048376 A1 * | 3/2003 | Peeples | ................... | B66C 13/46 348/373 |
| 2012/0144682 A1 * | 6/2012 | Vinati | ..................... | B66C 13/46 33/263 |
| 2014/0144862 A1 * | 5/2014 | Rintanen | ................ | B66C 13/18 212/276 |
| 2016/0167932 A1 * | 6/2016 | Holmberg | ............. | B66C 13/085 382/104 |
| 2019/0382245 A1 * | 12/2019 | Riley | ..................... | B66C 13/44 |

\* cited by examiner

*Primary Examiner* — Christopher W Fulton
(74) *Attorney, Agent, or Firm* — Tumey L.L.P.

(57) ABSTRACT

A method and apparatus for lifting loads support from a crane to eliminate swaying of the load includes providing the crane with a laser source on either side of the crane. The center of gravity of the load is marked on the load and the boom is positioned such that the laser lights projection on the ground or on surface of the load and the center of gravity of the load are aligned in a straight line.

11 Claims, 3 Drawing Sheets

CRANE POSITION INDICATOR

This application claims priority to provisional application Ser. No. 62/547,008 filed Aug. 17, 2017, the entire contents of which is incorporated herein by reference thereto.

BACKGROUND OF THE INVENTION

Field of the Invention

This invention relates to a device for indicating the correct position for the lifting portion of a crane or the like relative to a load.

Background of the Invention

In order to properly attach a crane to a load, the current state of the art is to rely upon hand signals and voice communication between the crane operator and a crew member monitoring the load at load level. This technique is challenging and can be inaccurate due to glaring lights and optical illusions created in poor lighting, especially on night shifts.

BRIEF SUMMARY OF SOME OF THE PREFERRED EMBODIMENTS

The invention disclosed and claimed in this application is directed to a method and apparatus for correctly positioning a lifting assembly such as a crane, hoist etc. over the item to be lifted without swaying of the load as it is raised which can cause personal injury and damage to the load and surroundings.

The invention utilizes a pair of lasers that are attached to the lifting device and are directed downwardly to either side of the item to be lifted. The center of gravity of the load is marked on the load according to known techniques. A pair of lasers are mounted latterly at the top of the lifting device such that a laser image on either side of the center of gravity is visible.

The top portion of the crane is in the proper position when an imaginary line between the two laser images passes through the center of gravity marked on the load.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
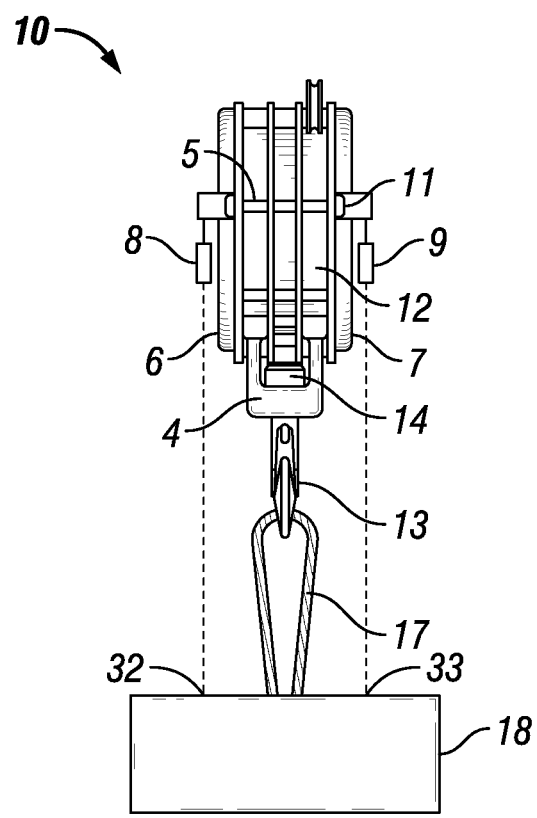
FIG. 1 is a view of a lifting device equipped with lasers according to a first embodiment of the invention.

Referring to FIG. 1, a conventional lifting device includes a pair of side plates 6, 7; a sleeve center pin 5, a plurality of sleeves 12, a hook support 4, a hook nut and swivel assembly 14, and a hook 13.

A cable 17 is attached to the crane 10 and to the load 18.

A pair of laser devices 8, 9 described below are attached to either side of the crane for example at the sheave center pin 5. Shaft 52 shown in FIG. 5 of the laser device is fixedly attached to the crane.

Figure 3:
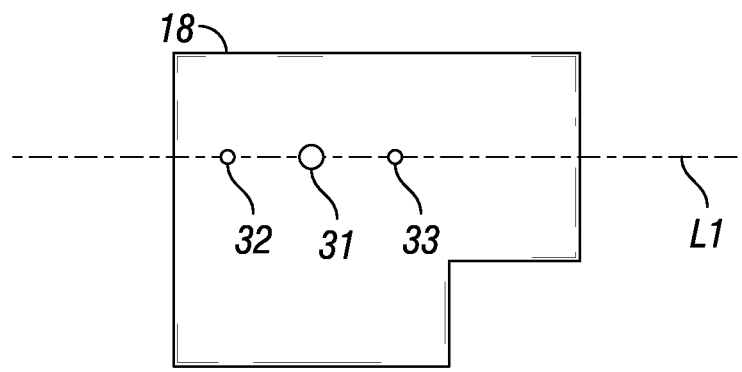
FIG. 3 is a representation of the center of gravity of the load and the laser images.

A method according to an embodiment of the invention can be described by reference to FIG. 3. The load 18 may be irregularly shaped. The center of gravity 31 of the load is marked on top of the load. Laser devices 8 and 9 are pivotably mounted on the crane so that by gravity they will be pointing perpendicular to the ground. Thus the laser lights will impinge on load 18 at 32 and 33. When points 32, 31, and 33 are aligned in a straight line as shown in FIG. 3, the top of the crane or lifting device is positioned correctly so that the load can be vertically raised without swaying.

Figure 2:
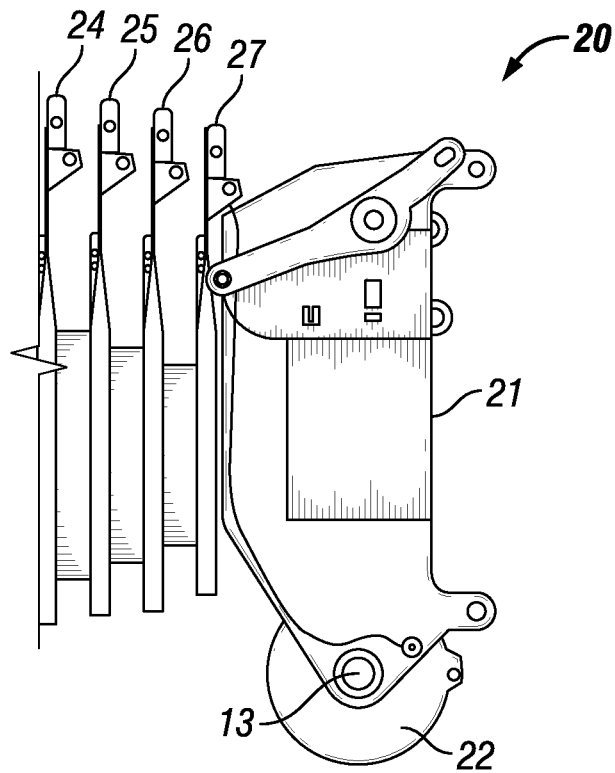
FIG. 2 is a view of a lifting device equipped with lasers according to a second embodiment of the invention.

FIG. 2 shows a second type of lifting device that can be positioned correctly according to the invention.

FIG. 2 shows the end portion 20 of a conventional mobile or portable crane. It includes a plurality of extensible boom sections 24, 25, 26, 27 connected to the lifting portion 21.

The lifting mechanism includes a plurality of sheaves 22 and a pivot pin connected 13. In this embodiment the laser devices 8, 9 are connected to each side of the lifting end 21 so that the laser will be directed perpendicular to the ground (as in the embodiment of FIG. 1) as the booms are raised and extended. It should be understood that the principles of this invention can be applied to any conventional lifting device.

Figure 4:
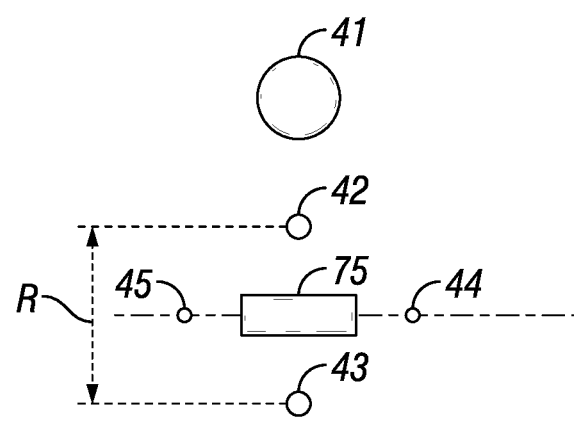
FIG. 4 is a schematic showing an embodiment of the invention for purposes of assembly or disassembly of a crane.

FIG. 4 represents the principle of this invention as applied to the assembly or disassembly of a crane. In this situation, the crane's footprint, when the crane is in a vertical position, is indicated at 41. When lifting or lowering a section of a crane to be assembled the minimum distance from the footprint to the lateral position of the crane piece 75 to be raised or lowered, called the minimum radius, is indicated at 42. The maximum radius for safety purpose is depicted at 43. The safety operating range for the radius is illustrated at R. Therefore, when the laser indicators 44 and 45 are located within R, the crane can be safely operated.

Figure 5:
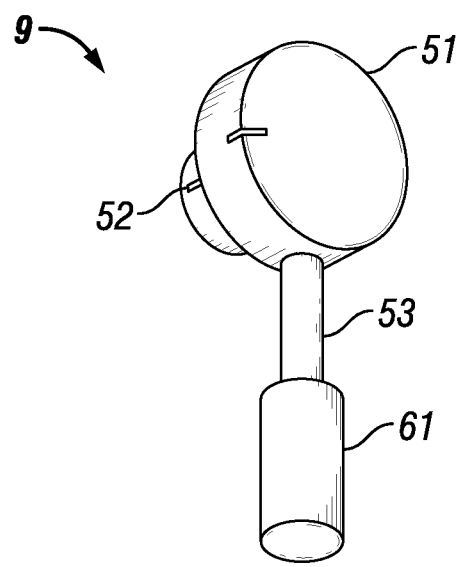
FIG. 5 is a perspective view of a laser unit according to an embodiment of the invention.

FIG. 5 illustrates a laser unit according to an embodiment of the invention. However it should be noted that the principle of the method invention disclosed and claimed herein does not rely on any specific laser unit. What is required is that the laser beam is directed downwardly in a perpendicular orientation at all positions of the crane.

In the embodiment of FIG. 5, the laser unit includes a central shaft 52 and a housing 51 rotatably supported on the shaft for example by a sleeve bearing 54. A weighted arm 53 is attached to the housing and includes a lower hollow cylindrical portion 61 which contains the laser beam generator 66, a battery 64, and a switch 65 which can be remotely actuated.

Figure 6:
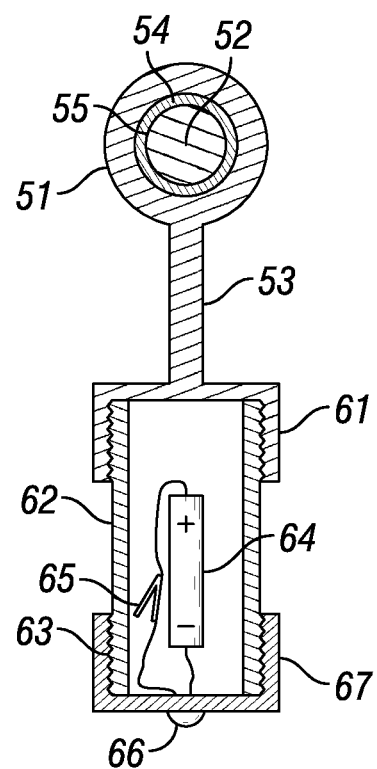
FIG. 6 is a cross sectional view of the laser unit of FIG. 5.

FIG. 6 is a cross-sectional view of the laser unit shown in FIG. 5. Housing 51 is rotatably supported a shaft 52 by a sleeve bearing 54 for example. Shaft 52 is adapted to be fixed to the top of the lifting device at the center pivot 11 of the sleeves as shown in FIG. 1 or at the center pivot 13 of the crane shown in FIG. 2. A hollow cylinder 62 is threadedly attached to housing 51 at an upper end and a cap 67 is threadedly attached to the cylinder 62 at a lower end.

Laser light 66, battery 64 and a switch 65 which may be remotely actuated are located within cylinder 62.

With this construction the laser light 66 will be directed downwardly toward the load 18 regardless of the orientation of the crane.

Although the present invention and its advantages have been described in detail, it should be understood that various changes, substitutions and alterations may be made herein without departing from the spirit and scope of the invention as defined by the appended claims.

What is claimed is:

1. A method of lifting a load vertically without swaying, comprising;
   a) marking the center of gravity of the load on top of the load;
   b) projecting a pair of laser lights perpendicular to the ground from two sides of a lifting device;
   c) manipulating the lifting device such that the projections of the laser lights are located on a top of the load;
   d) positioning the lifting device such that the center of gravity of the load is located between the projections of the laser lights, and the projections of the laser lights and center of gravity are aligned in a straight line; and
   e) lifting the load.

2. The method of claim 1 wherein the lifting device comprises a crane.

3. The method of claim 2, wherein the crane further comprises a telescoping boom that can be raised and lowered.

4. The method of claim 2, further comprising determining a safe operating range of the crane comprising a minimum radius from the crane's footprint and a maximum radius from the crane's footprint.

5. The method of claim 4, wherein the positioning further comprises maintaining the projections between the minimum radius and the maximum radius when lifting the load.

6. The method of claim 5, wherein the load comprises a component of a crane.

7. The method of claim 1 wherein the laser lights are pivotably mounted on the sides of the lifting device and include a weight extending from a housing for biasing the laser light in a downward direction.

8. The method of claim 7 wherein one or more of the laser lights comprises a laser light assembly, further comprising;
   a) a shaft;
   b) a housing rotatably supported on the shaft; and
   c) a weighted arm extending outwardly from the housing, the weighted arm including a laser light, a battery and a switch positioned within a hollow cylinder.

9. The method of claim 8 wherein the laser light assembly switch is remotely actuated.

10. The method of claim 7, wherein the laser lights are attached to either side of the lifting device at a sheave center pin.

11. The method of claim 1, wherein the load is irregularly shaped.

* * * * *